United States Patent
Qi et al.

(10) Patent No.: US 11,946,246 B2
(45) Date of Patent: Apr. 2, 2024

(54) ENERGY-STORING TEMPERATURE CONTROL MATERIAL AND PREPARATION METHOD AND APPLICATION THEREOF

(71) Applicant: Qilu University of Technology, Jinan (CN)

(72) Inventors: Letian Qi, Jinan (CN); Shoujuan Wang, Jinan (CN); Xia Meng, Jinan (CN); Fangong Kong, Jinan (CN); Ruhe Zhao, Jinan (CN); Chen Han, Jinan (CN); Debao Li, Jinan (CN)

(73) Assignee: Qilu University of Technology, Jinan (CN)

( * ) Notice: Subject to any disclaimer, the term of this patent is extended or adjusted under 35 U.S.C. 154(b) by 0 days.

(21) Appl. No.: 17/883,856

(22) Filed: Aug. 9, 2022

(65) Prior Publication Data

US 2022/0381026 A1     Dec. 1, 2022

Related U.S. Application Data

(63) Continuation of application No. PCT/CN2020/124118, filed on Oct. 27, 2020.

(30) Foreign Application Priority Data

Sep. 25, 2020  (CN) .......................... 202011021853.5

(51) Int. Cl.
| | | |
|---|---|---|
| *E04B 1/80* | (2006.01) | |
| *C09K 5/06* | (2006.01) | |
| *E04B 1/76* | (2006.01) | |
| *E04C 2/288* | (2006.01) | |
| *F28D 20/02* | (2006.01) | |
| *F28F 21/00* | (2006.01) | |

(52) U.S. Cl.
CPC ................ *E04B 1/80* (2013.01); *C09K 5/063* (2013.01); *E04B 1/76* (2013.01); *E04B 1/7608* (2013.01); *E04C 2/288* (2013.01); *F28D 20/023* (2013.01); *F28F 21/003* (2013.01); *E04B 2103/02* (2013.01); *E04B 2103/04* (2013.01); *E04B 2103/06* (2013.01)

(58) Field of Classification Search
CPC ............. C09K 5/02; C09K 5/06; C09K 5/063
See application file for complete search history.

(56) References Cited

U.S. PATENT DOCUMENTS

| 4,400,287 A | * | 8/1983 | Kimura | .................. C09K 5/063 |
| | | | | 165/902 |
| 6,615,906 B1 | * | 9/2003 | Fieback | .................... A61F 7/03 |
| | | | | 165/10 |

FOREIGN PATENT DOCUMENTS

| AU | 2020101806 A4 | * | 9/2020 | ............. C09K 5/06 |
| AU | 2020101808 A4 | * | 9/2020 | ............. C09K 5/06 |
| CN | 103666381 A | * | 3/2014 | ............. C09K 5/063 |
| CN | 107208420 A | | 9/2017 | |
| CN | 108441174 A | | 8/2018 | |
| CN | 108456509 A | * | 8/2018 | ............. C09K 5/063 |
| CN | 108531136 A | * | 9/2018 | ............. C09K 5/063 |
| CN | 111154457 A | | 5/2020 | |
| CN | 111394064 A | | 7/2020 | |
| CN | 111434746 A | | 7/2020 | |
| JP | 2009257698 A | | 11/2009 | |

OTHER PUBLICATIONS

Machine translation of CN 111154457 A to Xu et al. published May 2020 (Year: 2020).*
Machine translation of CN 108456509 A to Tie et al. published Aug. 2018 (Year: 2018).*
Machine translation of CN 108531136 A to Cao et al. published Sep. 2018 (Year: 2018).*
Machine translation of CN 103666381 A to Liu et al. published Mar. 2014 (Year: 2014).*

* cited by examiner

*Primary Examiner* — Jane L Stanley
(74) *Attorney, Agent, or Firm* — Nitin Kaushik

(57) ABSTRACT

The present invention provides an energy-storing temperature control material, and belongs to the technical field of temperature control materials. In the energy-storing temperature control material provided in the present invention, the organic synthetic fiber based phase-change material has a three-dimensional dispersion effect, and can form a network constraint for remaining phase-change materials to reinforce mechanical properties of the materials, thereby fixing shapes of the materials and avoiding a liquid-crystal phase separation phenomenon in the phase-change process. The phase-change energy storage agent can absorb and release the heat by means of solid-liquid phase conversion of the material, to achieve the temperature control effect; and the phase-change temperature regulator can regulate a phase-change temperature range of the phase-change material, to make the energy-storing temperature control material suitable for climatic features of northern China.

7 Claims, No Drawings

ENERGY-STORING TEMPERATURE CONTROL MATERIAL AND PREPARATION METHOD AND APPLICATION THEREOF

CROSS-REFERENCE TO RELATED APPLICATIONS

The application claims priority to Chinese patent application No. 202011021853.5, filed on Sep. 25, 2020, the entire contents of which are incorporated herein by reference.

TECHNICAL FIELD

The present invention relates to the technical field of temperature control materials, and in particular, to an energy-storing temperature control material, a preparation method thereof, and an application thereof as a house building insulation layer.

BACKGROUND

Northern China (at a latitude of 33-53° N) is cold in winter and hot in summer, and there is a big temperature difference between day and night, which results in that northern houses consume a large amount of energy for temperature control every year. As important renewable energy, the solar energy can greatly alleviate the consumption of energy for cooling and heating the northern houses if effectively utilized. The solar energy, however, is intermittent energy and cannot be continuously produced. Therefore, the development of energy-storing temperature control materials is a key to fully utilize the solar energy.

For existing energy-storing temperature control materials such as inorganic hydrate based phase-change heat storage materials and plant fiber based phase-change heat storage materials, in case of a low temperature in practical application, junctions between the hydrate in the materials and the hydroxyl in the plant fibers are crystallized and solidified to cause a liquid-crystal phase separation phenomenon, and consequently, both the heat transfer efficiency and the heat storage efficiency are reduced. In addition, the phase-change materials are converted between a solid state and a liquid state for a long time and tend not to be fixed and formed. Meanwhile, the hydrated materials often have overcooling and other problems for lack of crystal nucleus during crystallization, and consequently, the heat exchange efficiency and the temperature control efficiency of the materials are reduced. Therefore, the existing energy-storing temperature control materials are unsuitable for the house buildings in northern China.

SUMMARY

In view of this, an objective of the present invention is to provide an energy-storing temperature control material, a preparation method thereof, and an application thereof as a house building insulation layer. The energy-storing temperature control material provided in the present invention is suitable for northern buildings and can effectively reduce the energy consumption for temperature control of the house buildings.

To achieve the above objective of the present invention, the present invention provides the following technical solutions:

The invention provides an energy-storing temperature control material, comprising the following components by mass percentage:
 2-10% of organic synthetic fiber based phase-change material,
 20-70% of phase-change energy storage agent,
 3-10% of phase-change temperature regulator,
 3-7% of nucleating agent,
 1-5% of thickening stabilizer,
 0.1-1% of preservative, and
 the balance being water, wherein
 the nucleating agent is one or more of nano-calcium carbonate, nano-carbon particles, nano-magnesium silicate, nano-calcium oxide, nano-magnesium oxide, nano-cellulose and nano-lignin; and
 the energy-storing temperature control material has a phase-change point of 18-40° C., a thermal conductivity of 0.1-0.9 W·m−1·K−1, and a specific heat capacity of 1000-3000 J·kg−1·K−1.

Preferred, comprising the following components by mass percentage:
 3-6% of organic synthetic fiber based phase-change material,
 35-55% of phase-change energy storage agent,
 4-7% of phase-change temperature regulator,
 4-6% of nucleating agent,
 1-2% of thickening stabilizer,
 0.3-0.8% of preservative, and
 the balance being water.

Preferred, the organic synthetic fiber based phase-change material comprises one or more of a bacterial cellulose fiber, a rayon fiber, a carboxymethyl cellulose fiber, a cellulose acetate fiber, a polypropylene fiber, a polyacrylate fiber, a polyacrylamide fiber and a polyol ester fiber; and
 the organic synthetic fiber based phase-change material has a diameter of 10-25 μm and a length of 5 mm.

Preferred, the phase-change energy storage agent comprises one or more of borax, sodium silicate decahydrate, ferrous sulfate heptahydrate, potassium aluminum sulfate dodecahydrate, magnesium chloride hexahydrate, zinc sulfate heptahydrate, copper sulfate pentahydrate, barium hydroxide octahydrate, calcium sulfate dihydrate and calcium disulfate monohydrate;
 the phase-change temperature regulator is one or more of ammonium chloride, sodium chloride, potassium chloride and calcium chloride;
 the thickening stabilizer is one or more of starch, dextrin, a polysaccharide derivative, carboxymethyl cellulose, polyvinylpyrrolidone, polyvinyl alcohol and a polyethylene oxide-polypropylene oxide block copolymer; and
 the preservative is one or more of calcium hypochlorite, sodium benzoate, potassium sorbate, calcium sorbate, paraben, chloramine, copper sulfate, methylene dithiocyanate, isothiazolinone and a phenol compound.

The invention provides a preparation method of the energy-storing temperature control material, comprising the following steps:
 (1) providing a thickening stabilizer aqueous solution; and
 (2) mixing the thickening stabilizer aqueous solution with an organic synthetic fiber based phase-change material, a phase-change energy storage agent, a phase-change temperature regulator, a preservative and a nucleating agent, and performing heating and stirring to obtain the energy-storing temperature control material.

Preferred, the mass concentration of the thickening stabilizer aqueous solution is 1-8%.

Preferred, the temperature for the heating and stirring is 20-60° C., a rate is 100-800 rpm and time is 2-12 h.

The invention also provides an application of the energy-storing temperature control material as a house building insulation layer, a method of the application comprising the following steps:

(1) packaging the energy-storing temperature control material, and then paving and adhering the energy-storing temperature control material between two layers of gypsum boards to obtain an energy-storing temperature control board; and (2) wrapping the energy-storing temperature control board by using metal-foil, and then embedding the energy-storing temperature control board wrapped by the foil between a wall brick layer of an interior wall of a house and a gypsum layer.

Preferred, the usage of the energy-storing temperature control material on the wall is 5-20 kg/m2.

Preferred, the packaged energy-storing temperature control material is of a tubular shape, a platy shape or a spherical shape; and the energy-storing temperature control board has a thickness of 5-30 mm.

The present invention provides an energy-storing temperature control material, which includes the following components by mass percentage: 2-10% of organic synthetic fiber based phase-change material, 20-70% of phase-change energy storage agent, 3-10% of phase-change temperature regulator, 3-7% of nucleating agent, 1-5% of thickening stabilizer, 0.1-1% of preservative, and the balance being water; and the nucleating agent is one or more of nano-calcium carbonate, nano-carbon particles, nano-magnesium silicate, nano-calcium oxide, nano-magnesium oxide, nano-cellulose and nano-lignin. In the energy-storing temperature control material provided by the present invention, the organic synthetic fiber based phase-change material has a three-dimensional dispersion effect, and can form a network constraint for remaining phase-change materials to reinforce mechanical properties of the materials, thereby fixing shapes of the materials and avoiding a liquid-crystal phase separation phenomenon during the phase-change process. The nucleating agent can provide phase-change crystal nucleus for the material, to improve the heat absorption and release efficiency of the material. Meanwhile, the organic synthetic fiber based phase-change material composed of porous fibers can load the nucleating agent, so that the nucleating agent is uniformly distributed in the phase-change material, thereby inducing the formation of crystal nucleus during crystallization, avoiding the overcooling phenomenon and improving the heat exchange efficiency. In the present invention, the phase-change energy storage agent can absorb and release the heat by means of solid-liquid phase conversion of the material to achieve the temperature control effect. The phase-change temperature regulator can regulate a phase-change temperature range of the phase-change material to make the energy-storing temperature control material suitable for climatic features of northern China. The thickening stabilizer can improve the system viscosity, so that the temperature control material is in a stable state. Under the joint action of the above components, the energy-storing temperature control material has a phase-change point of 18-40° C., a thermal conductivity of 0.1-0.9 $W \cdot m^{-1} \cdot K^{-1}$ and a specific heat capacity of 1000-3000 $J \cdot kg^{-1} \cdot K^{-1}$, and is more suitable for the climate features of northern China. When the environmental temperature is higher than the phase-change point of the material, the energy-storing temperature control material absorbs the heat and performs cooling, and the material is converted from the solid state into the liquid state. When the temperature is lower than the phase-change point, the energy-storing temperature control material performs cold storage and releases the heat, and the material is converted from the liquid state to the solid state. As the house building insulation layer, the material can implement functions of storing the heat and performing cooling in the day, and performing cold storage and releasing the heat in the night, thereby effectively reducing the energy consumption for temperature control of the northern house buildings. Results in embodiments show that when the energy-storing temperature control material provided in the present invention is used in the house building insulation layer in northern China, the annual energy consumption for cooling and heating can be reduced by 7% or more compared with the houses not using the energy-storing temperature control material.

The present invention provides a preparation method of the energy-storing temperature control material. The method only needs to mix a thickening stabilizer aqueous solution with other components, so that the operation is simple, and the industrial large-scale production is implemented easily.

DETAILED DESCRIPTION OF THE EMBODIMENTS

The present invention provides an energy-storing temperature control material, which includes the following components by mass percentage:

2-10% of organic synthetic fiber based phase-change material, 20-70% of phase-change energy storage agent, 3-10% of phase-change temperature regulator, 3-7% of nucleating agent, 1-5% of thickening stabilizer, 0.1-1% of preservative, and the balance being water.

Unless particularly stated, the raw materials used in the present invention are all commercially available.

Based on the mass percentage, the energy-storing temperature control material provided in the present invention includes 2-10%, preferably 3-6%, of organic synthetic fiber based phase-change material. In the present invention, the organic synthetic fiber based phase-change material preferably includes one or more of a bacterial cellulose fiber, a rayon fiber, a carboxymethyl cellulose fiber, a cellulose acetate fiber, a polypropylene fiber, a polyacrylate fiber, a polyacrylamide fiber and a polyol ester fiber. In the present invention, the organic synthetic fiber based phase-change material preferably has a diameter of 10-25 μm and a length of 5 mm. In the present invention, the organic synthetic fibers are light in weight, high in strength, good in elasticity and small in moisture absorption, and the organic synthetic fiber based phase-change material has a three-dimensional dispersion effect, and can form a network constraint for remaining phase-change materials to reinforce mechanical properties of the materials, thereby fixing shapes of the materials and avoiding a liquid-crystal phase separation phenomenon in the phase-change process. Meanwhile, by virtue of large specific surface areas of the fibers, the phase-change material is restricted by pores of the fibers from flowing, and is thickened and tackified, so that the phase-change material is in a stable state.

Based on the mass percentage, the energy-storing temperature control material provided in the present invention includes 20-70%, preferably 35-55%, of phase-change energy storage agent. In the present invention, the phase-change energy storage agent preferably includes one or more of borax, sodium silicate decahydrate, ferrous sulfate heptahydrate, potassium aluminum sulfate dodecahydrate, magnesium chloride hexahydrate, zinc sulfate heptahydrate, copper sulfate pentahydrate, barium hydroxide octahydrate, calcium sulfate dihydrate and calcium disulfate monohydrate, more preferably, a combination of the sodium silicate decahydrate and the ferrous sulfate heptahydrate, a combination of the potassium aluminum sulfate dodecahydrate and the magnesium chloride hexahydrate or a combination of the zinc sulfate heptahydrate and the copper sulfate pentahydrate. In the present invention, the phase-change energy storage agent can absorb and release the heat by means of solid-liquid phase conversion of the energy storage agent to achieve the temperature control effect of the houses.

Based on the mass percentage, the energy-storing temperature control material provided in the present invention includes 3-10%, preferably 4-7%, of phase-change temperature regulator. In the present invention, the phase-change temperature regulator is preferably one or more of ammonium chloride, sodium chloride, potassium chloride and calcium chloride, more preferably the ammonium chloride and the potassium chloride. In the present invention, the phase-change temperature regulator can regulate the phase-change point of the phase-change energy storage agent to make the material suitable for the climatic features of northern China.

Based on the mass percentage, the energy-storing temperature control material provided in the present invention includes 3-7%, preferably 4-6%, of nucleating agent. In the present invention, the nucleating agent is one or more of nano-calcium carbonate, nano-carbon particles, nano-magnesium silicate, nano-calcium oxide, nano-magnesium oxide, nano-cellulose and nano-lignin, preferably the nano-calcium carbonate or the nano-carbon particles. The particle size of the nucleating agent is preferably 10-800 nm, more preferably 50-500 nm. In the present invention, the organic synthetic fiber based phase-change material composed of porous fibers can load the nucleating agent, so that the nucleating agent is uniformly distributed in the phase-change material, thereby inducing the formation of crystal nucleus during crystallization, avoiding the overcooling phenomenon and improving the heat absorption and release efficiency.

Based on the mass percentage, the energy-storing temperature control material provided in the present invention includes 1-5%, preferably 1-2%, of thickening stabilizer. In the present invention, the thickening stabilizer is preferably one or more of starch, dextrin, a polysaccharide derivative, carboxymethyl cellulose, polyvinylpyrrolidone, polyvinyl alcohol and a polyethylene oxide-polypropylene oxide block copolymer, more preferably one or more of the polyvinylpyrrolidone, the polyvinyl alcohol and the polyethylene oxide-polypropylene oxide block copolymer. In the present invention, the polysaccharide derivative is preferably carboxymethyl cellulose and hydroxyethyl cellulose. The number-average molecular weight of each of the polyvinylpyrrolidone, the polyvinyl alcohol and the polyethylene oxide-polypropylene oxide block copolymer is preferably $1 \cdot 10^5$-$5 \cdot 10^6$. In the present invention, the thickening stabilizer can improve the system viscosity, so that the temperature control material is stably in the state of a suspension or an emulsion.

Based on the mass percentage, the energy-storing temperature control material provided in the present invention includes 0.1-1%, preferably 0.3-0.8%, of preservative. In the present invention, the preservative is preferably one or more of calcium hypochlorite, sodium benzoate, potassium sorbate, calcium sorbate, paraben, chloramine, copper sulfate, methylene dithiocyanate, isothiazolinone and phenol. In the present invention, the preservative can inhibit the microbial growth to avoid decay and corrosion of the product.

In the present invention, the phase-change point of the energy-storing temperature control material is 18-40° C., preferably 20-30° C. and further preferably 28° C. The thermal conductivity is 0.1-0.9 W·m−1·K−1, preferably 0.3-0.6 W·m−1·K−1, and further preferably 0.5 W·m−1·K−1. The specific heat capacity is 1000-3000 J·kg−1·K−1, preferably 1500-2500 J·kg−1·K−1, and further preferably 1800 J·kg−1·K−1. In the present invention, the density of the energy-storing temperature control material is preferably 300-1500 kg/m3, more preferably 500-1300 kg/m3, and further preferably 1300 kg/m3. The phase-change temperature of the energy-storing temperature control material provided in the present invention is suitable for the climate features of northern China. As the house building insulation layer, the material can achieve functions of storing the heat and performing cooling in the day, and releasing the heat and performing cold storage in the night, thereby effectively reducing the energy consumption for temperature control of the house buildings.

The present invention provides a preparation method of the energy-storing temperature control material, which includes the following steps:
(1) providing a thickening stabilizer aqueous solution; and
(2) mixing the thickening stabilizer aqueous solution with a fiber based phase-change material, a phase-change energy storage agent, a phase-change temperature regulator, a preservative and a nucleating agent, and performing heating and stirring to obtain the energy-storing temperature control material.

The present invention first provides the thickening stabilizer aqueous solution. The present invention has no special requirement on the preparation method of the thickening stabilizer aqueous solution, provided that the method is known to a person skilled in the art, specifically, for example, the thickening stabilizer is mixed with water by stirring. In the present invention, the mass concentration of the thickening stabilizer aqueous solution is preferably 1-8%, more preferably 2-6%.

In the present invention, the thickening stabilizer aqueous solution is mixed with the fiber based phase-change material, the phase-change energy storage agent, the phase-change temperature regulator, the preservative and the nucleating agent, and the heating and stirring are performed, to obtain the energy-storing temperature control material. During mixing, according to the present invention, the fiber based phase-change material, the phase-change energy storage agent, the phase-change temperature regulator, the preservative and the nucleating agent are preferably added to the thickening stabilizer aqueous solution in sequence. The present invention has no special requirement on the heating and stirring manner, provided that the manner is known to a person skilled in the art. In the present invention, the temperature for heating and stirring is preferably 20-60° C., more preferably 30-50° C.; the rate is preferably 100-800 rpm, more preferably 300-500 rpm; and the time is preferably 2-12 h, more preferably 5-10 h.

The present invention provides an application of the energy-storing temperature control material as a house building insulation layer. In the present invention, the use amount of the energy-storing temperature control material on a wall in the application is preferably 5-20 kg/m2, more preferably 10-15 kg/m2.

In the present invention, a method of the application includes the following steps:

(1) packaging the energy-storing temperature control material, and then paving and adhering the energy-storing temperature control material between two layers of gypsum boards to obtain an energy-storing temperature control board; and
(2) wrapping the energy-storing temperature control board by using metal foil, and then embedding the energy-storing temperature control board wrapped by the metal foil between a wall brick layer of an interior wall of a house and a gypsum layer.

In the present invention, the energy-storing temperature control material is packaged, and then is paved and adhered between the two layers of gypsum boards, to obtain the energy-storing temperature control board. The present invention preferably uses a plastic packaging machine for packaging. The packaged energy-storing temperature control material is of a rod-like shape, a platy shape or a spherical shape. In the present invention, the packaged rod-like energy-storing temperature control material preferably has a length of 10-30 cm and preferably has an outer diameter of 0.1-2 cm. The packaged platy energy-storing temperature control material preferably has a length of 10-30 cm, preferably has a width of 3-10 cm, and preferably has a thickness of 0.1-2 cm. The diameter of the packaged spherical energy-storing temperature control material is preferably 3-20 mm.

The present invention has no special requirement on the gypsum board, provided that the gypsum board is known to a person skilled in the art. In the present invention, the two layers of gypsum boards are preferably fixed through a framework, with a space therebetween preferably being 20 mm. In the present invention, there are two paving and adhering manners. The first manner is to uniformly pave and adhere the packaged energy-storing temperature control material on one side between the two layers of gypsum boards to form an air interlayer with the gypsum board on the other side. The second manner is to loosely pave and adhere the packaged energy-storing temperature control material on two sides between the two layers of gypsum boards.

When the amount of the adhered energy-storing temperature control material is large, the present invention further preferably uses metal wires to fix the energy-storing temperature control material in a grid manner. In the present invention, the amount of the paved and adhered energy-storing temperature control material is the same as the above use amount per square meter on the wall. In the present invention, the thickness of the energy-storing temperature control board is preferably 5-30 mm, more preferably 10-20 mm. In the present invention, in the manner of first packaging the material and then preparing the material into the temperature control board, the energy-storing temperature control material can be maintained in a packaged form in use, which is advantageous for heat storage and heat release of the energy-storing temperature control material.

After the energy-storing temperature control board is obtained, according to the present invention, the energy-storing temperature control board is wrapped by using the metal foil, and then the energy-storing temperature control board wrapped by the metal foil is embedded between the wall brick layer of the interior wall of the house and the gypsum layer. In the present invention, the metal foil is preferably an aluminum foil. The wrapping thickness of the metal foil is preferably 0.01-0.2 mm. The present invention preferably uses the metal foil to wrap an outer surface of the energy-storing temperature control board entirely. The present invention has no special requirement on the wrapping manner of the metal foil, provided that the wrapping manner is known to a person skilled in the art.

The energy-storing temperature control material, the preparation method thereof, and the application thereof as the house building insulation layer that are provided in the present invention will be described below in detail with reference to embodiments. However, these embodiments cannot be understood as limitation to a scope of protection of the present invention.

Embodiment 1

(1) 2.2 g of polyethylene oxide-polypropylene oxide block copolymer having a number-average molecular weight of 105-106 was added to 100 g of water, and stirring was performed at a constant temperature of 35° C. to obtain a thickening stabilizer aqueous solution.

(2) 7.5 g of polypropylene fiber, 5 g of borax, 40 g of sodium silicate decahydrate, 12 g of ammonium chloride, 7.5 g of nano-calcium carbonate and 2.5 g of chloramine were added to the thickening stabilizer aqueous solution in sequence, and stirring was performed for 2 h at a rate of 500 rpm at 35° C., to obtain an energy-storing temperature control material.

The obtained energy-storing temperature control material is tested in phase-change point, density, thermal conductivity and specific heat capacity. Upon the test, the obtained energy-storing temperature control material has a phase-change point of 25° C., a density of 1300 g/m3, a thermal conductivity of 0.5 W·m−1·K−1, and a specific heat capacity of 1800 J·kg−1·K−1; and the enthalpy is 68400 J/kg at 18-28° C., and 212400 J/kg at 28-68° C.

APPLICATION EXAMPLE 1

The energy-storing temperature control material obtained in Embodiment 1 is added to a building wall of a simulative house to test an annual energy consumption effect of the simulative house, and a simulative house to which the energy-storing temperature control material is not added is used as a control group. The specific method is as follows:

(1) A plastic packaging machine was used to package the energy-storing temperature control material obtained in Embodiment 1 into a rod-like shape, the rod-like shape having dimensions of 3 mm*5 mm*10 mm; and after packaged, the material was densely paved and adhered on gypsum boards to form a temperature control board with a thickness of 7 mm, and an air interlayer has a thickness of approximately 13 mm.

(2) The energy-storing temperature control board was wrapped by using an aluminum foil, and then the energy-storing temperature control board wrapped by the aluminum foil was embedded between a wall brick layer of an interior wall of the simulative house and a gypsum layer, the use amount of the energy-storing temperature control material on the wall being 10 kg/m2.

The simulative house has dimensions of 8 m*6 m*3 m, is provided with a window on a south wall, and is centrally placed; and the window-wall ratio is 0.33. The heat source has a power of 1000 W; and the temperature control is set as: 20° C. for heating, and 24° C. for cooling.

By making statistics and calculations on annual energy consumption for cooling and heating the simulative house in the test group and the simulative house in the control group in harsh climate regions of northern China, results are shown in Table 1.

TABLE 1

Annual energy consumption for cooling and heating simulative house in test group and simulative house in control group in harsh climate regions of northern China in Application Example 1

| | Control Group | | | Experimental Group | | | Percentage of total energy consumption and energy saving (%) |
|---|---|---|---|---|---|---|---|
| City | Heating energy consumption (J) | Cooling energy consumption (J) | Total (J) | Heating energy consumption (J) | Cooling energy consumption (J) | Total (J) | |
| Razdolnaya River | 1.88E+10 | 5.17E+08 | 1.93E+10 | 1.3E+10 | 7.53E+08 | 1.37E+10 | 28.98 |
| Lark Temple | 1.62E+10 | 9.58E+08 | 1.71E+10 | 1.15E+10 | 1.06E+09 | 1.25E+10 | 26.78 |
| Urumqi | 1.19E+10 | 1.92E+09 | 1.39E+10 | 1.09E+10 | 1.89E+09 | 1.28E+10 | 7.81 |
| Harbin | 1.54E+10 | 1.12E+09 | 1.65E+10 | 1.41E+10 | 1.11E+09 | 1.52E+10 | 7.97 |
| Changchun | 1.4E+10 | 1.12E+09 | 1.51E+10 | 1.28E+10 | 1.12E+09 | 1.39E+10 | 7.91 |
| Xining | 8.67E+09 | 2.64E+08 | 8.93E+09 | 7.86E+09 | 2.94E+08 | 8.16E+09 | 8.68 |
| Shenyang | 1.06E+10 | 1.78E+09 | 1.24E+10 | 9.67E+09 | 1.76E+09 | 1.14E+10 | 7.78 |
| Hohhot | 1.09E+10 | 1.36E+09 | 1.23E+10 | 9.95E+09 | 1.36E+09 | 1.13E+10 | 7.85 |

As can be learned from Table 1, the annual energy consumption for cooling and heating the simulative house that uses the energy-storing temperature control material provided in the present invention as the insulation layer is significantly reduced. The total annual energy consumption for cooling and heating the simulative house in Suifenhe region of Heilongjiang is reduced from 1.93 E+10 (J) to 1.37 E+10 (J), a decrease of 28.98% in energy consumption. The total annual energy consumption for cooling and heating the simulative house in Bailingmiao region of Inner Mongolia is reduced from 1.71 E+10 (J) to 1.25 E+10 (J), a decrease of 26.78% in energy consumption. The total annual energy consumption for cooling and heating the simulative house in Urumchi region of Xinjiang is reduced from 1.39 E+10 (J) to 1.28 E+10 (J), a decrease of 7.81% in energy consumption. The total annual energy consumption for cooling and heating the simulative house in Harbin region of Heilongjiang is reduced from 1.65 E+10 (J) to 1.52 E+10 (J), a decrease of 7.97% in energy consumption. The total annual energy consumption for cooling and heating the simulative house in Changchun region of Jilin is reduced from 1.51 E+10 (J) to 1.39 E+10 (J), a decrease of 7.91% in energy consumption. The total annual energy consumption for cooling and heating the simulative house in Xining region of Qinghai is reduced from 8.93 E+09 (J) to 8.16 E+09 (J), a decrease of 8.68% in energy consumption. The total annual energy consumption for cooling and heating the simulative house in Shenyang region of Liaoning is reduced from 1.24 E+10 (J) to 1.14 E+10 (J), a decrease of 7.78% in energy consumption. The total annual energy consumption for cooling and heating the simulative house in Hohhot region of Inner Mongolia is reduced from 1.23 E+10 (J) to 1.13 E+10 (J), a decrease of 7.85% in energy consumption.

Embodiment 2

(1) 2 g of polyvinyl alcohol having a number-average molecular weight of 105-106 was added to 100 g of water, and stirring was performed at a constant temperature of 35° C., to obtain a thickening stabilizer aqueous solution.

(2) 7.5 g of polyacrylamide fiber, 6 g of borax, 45 g of ferrous sulfate heptahydrate, 8 g of sodium chloride, 7.5 g of nano-magnesium silicate, 0.8 g of calcium chloride, and 2.5 g of paraben were added to the thickening stabilizer aqueous solution in sequence, and stirring was performed for 2 h at a rate of 500 rpm at 35° C., to obtain an energy-storing temperature control material.

The obtained energy-storing temperature control material is tested in phase-change point, density, thermal conductivity and specific heat capacity. Upon the test, the obtained energy-storing temperature control material has a phase-change point of 28° C., a density of 500 g/m3, a thermal conductivity of 0.215 W·m−1·K−1, and a specific heat capacity of 1800 J·kg−1·K−1; and the enthalpy is 32400 J/kg at 18-28 ° C., and 176400 J/kg at 28-40 ° C.

APPLICATION EXAMPLE 2

The energy-storing temperature control material obtained in Embodiment 2 is added to a building wall of a simulative house to test an annual energy consumption effect of the simulative house, and a simulative house to which the energy-storing temperature control material is not added is used as a control group. The specific method is as follows:

(1) A plastic packaging machine was used to package the energy-storing temperature control material obtained in Embodiment 2 into a rod-like shape, the rod-like shape having dimensions of 3 mm*5 mm*10 mm; and after packaged, the material was loosely paved and adhered to form a temperature control board having a thickness of 20 mm (the temperature control material accounts for 38% by volume).

(2) The energy-storing temperature control board was wrapped by using an aluminum foil, and then the energy-storing temperature control board wrapped by the aluminum foil was embedded between a wall brick layer of an interior wall of the simulative house and a gypsum layer, the use amount of the energy-storing temperature control material on the wall being 10 kg/m2.

The simulative house has dimensions of 8 m*6 m*3 m, is provided with a window on a south wall, and is centrally placed; and the window-wall ratio is 0.33. The heat source has a power of 1000 W; and the temperature control is set as: 20° C. for heating, and 24° C. for cooling.

By making statistics and calculations on annual energy consumption for cooling and heating the simulative house in the test group and the simulative house in the control group in harsh climate regions of northern China, results are shown in Table 2.

TABLE 2

Annual energy consumption for cooling and heating simulative house in test group and simulative house in control group in harsh climate regions of northern China in Application Example 2.

| City | Control Group | | | Experimental Group | | | Percentage of total energy consumption and energy saving (%) |
|---|---|---|---|---|---|---|---|
| | Heating energy consumption (J) | Cooling energy consumption (J) | Total (J) | Heating energy consumption (J) | Cooling energy consumption (J) | Total (J) | |
| Taiyuan | 7.13E+09 | 1.7E+09 | 8.83E+09 | 6.46E+09 | 1.7E+09 | 8.16E+09 | 7.60% |
| Shijiazhuang | 6.17E+09 | 3.06E+09 | 9.24E+09 | 5.59E+09 | 2.97E+09 | 8.56E+09 | 7.31% |
| Beijing | 6.67E+09 | 2.68E+09 | 9.34E+09 | 6.05E+09 | 2.61E+09 | 8.66E+09 | 7.31% |
| Tianjin | 6.68E+09 | 2.7E+09 | 9.38E+09 | 6.06E+09 | 2.64E+09 | 8.7E+09 | 7.25% |
| Jinan | 5.27E+09 | 3.25E+09 | 8.52E+09 | 4.76E+09 | 3.15E+09 | 7.9E+09 | 7.25% |
| Xian | 5.55E+09 | 2.75E+09 | 8.3E+09 | 5.02E+09 | 2.66E+09 | 7.68E+09 | 7.44% |
| Zhengzhou | 4.96E+09 | 3.17E+09 | 8.13E+09 | 4.48E+09 | 3.08E+09 | 7.56E+09 | 7.07% |
| Yinchuan | 8.26E+09 | 1.54E+09 | 9.8E+09 | 7.51E+09 | 1.53E+09 | 9.04E+09 | 7.74% |
| Lasa | 5.55E+09 | 1.88E+08 | 5.74E+09 | 4.98E+09 | 2.42E+08 | 5.23E+09 | 8.96% |
| Dalian | 8E+09 | 1.64E+09 | 9.64E+09 | 7.26E+09 | 1.64E+09 | 8.9E+09 | 7.68% |
| Lanzhou | 6.74E+09 | 1.4E+09 | 8.14E+09 | 6.1E+09 | 1.4E+09 | 7.5E+09 | 7.89% |

As can be learned from Table 2, the annual energy consumption for cooling and heating the simulative house that uses the energy-storing temperature control material provided in the present invention as the insulation layer is significantly reduced. The total annual energy consumption for cooling and heating the simulative house in Taiyuan region of Shanxi is reduced from 8.83 E+09 (J) to 8.16 E+09 (J), a decrease of 7.60% in energy consumption. The total annual energy consumption for cooling and heating the simulative house in Shijiazhuang region of Hebei is reduced from 9.24 E+09 (J) to 8.56 E+09 (J), a decrease of 7.31% in energy consumption. The total annual energy consumption for cooling and heating the simulative house in Beijing region is reduced from 9.34 E+09 (J) to 8.66 E+09 (J), a decrease of 7.31% in energy consumption. The total annual energy consumption for cooling and heating the simulative house in Tianjin region is reduced from 9.38 E+09 (J) to 8.70 E+09 (J), a decrease of 7.25% in energy consumption. The total annual energy consumption for cooling and heating the simulative house in Jinan region of Shandong is reduced from 8.52 E+09 (J) to 7.90 E+09 (J), a decrease of 7.25% in energy consumption. The total annual energy consumption for cooling and heating the simulative house in Xi'an region of Shanxi is reduced from 8.30 E+09 (J) to 7.68 E+09 (J), a decrease of 7.44% in energy consumption. The total annual energy consumption for cooling and heating the simulative house in Zhengzhou region of Henan is reduced from 8.13 E+09 (J) to 7.56 E+09 (J), a decrease of 7.07% in energy consumption. The total annual energy consumption for cooling and heating the simulative house in Yinchuan region of Ningxia is reduced from 9.80 E+09 (J) to 9.04 E+09 (J), a decrease of 7.74% in energy consumption. The total annual energy consumption for cooling and heating the simulative house in Lhasa region of Tibet is reduced from 5.74 E+09 (J) to 5.23 E+09 (J), a decrease of 8.96% in energy consumption. The total annual energy consumption for cooling and heating the simulative house in Dalian region of Liaoning is reduced from 9.64 E+09 (J) to 8.90 E+09 (J), a decrease of 7.68% in energy consumption. The total annual energy consumption for cooling and heating the simulative house in Lanzhou region of Gansu is reduced from 8.14 E+09 (J) to 7.50 E+09 (J), a decrease of 7.89% in energy consumption.

The above are only preferred embodiments of the present invention. It should be noted that a person of ordinary skill in the art may further make several improvements and modifications without departing from the principle of the present invention, and these improvements and modifications should also be considered as the scope of protection of the present invention.

What is claimed is:

1. An energy-storing temperature control material, comprising the following components by mass percentage:
   2-10% of organic synthetic fiber based phase-change material,
   20-70% of phase-change energy storage agent,
   3-10% of phase-change temperature regulator,
   3-7% of nucleating agent,
   1-5% of thickening stabilizer,
   0.1-1% of preservative, and
   the balance being water, wherein
   the organic synthetic fiber based phase-change material comprises one or more of a bacterial cellulose fiber, a rayon fiber, a carboxymethyl cellulose fiber, a cellulose acetate fiber, a polypropylene fiber, a polyacrylate fiber, a polyacrylamide fiber and a polyol ester fiber; and the organic synthetic fiber based phase-change material has a diameter of 10-25 μm and a length of 5 mm, a particle size of the nucleating agent is from 10 nm to 800 nm; the organic synthetic fiber based phase-change material is composed of porous fibers to load the nucleating agent so that the nucleating agent is uniformly distributed in the organic synthetic fiber based phase-change material;
   the nucleating agent is one or more of nano-calcium carbonate, nano-carbon particles, nano-magnesium silicate, nano-calcium oxide, nano-magnesium oxide, nano-cellulose and nano-lignin; and
   the energy-storing temperature control material has a phase-change point of 18-40° C., a thermal conductivity of 0.1-0.9 $W \cdot m^{-1} \cdot K^{-1}$, and a specific heat capacity of 1000-3000 $J \cdot kg^{-1} \cdot K^{-1}$.

2. The energy-storing temperature control material according to claim 1, comprising the following components by mass percentage:
   3-6% of organic synthetic fiber based phase-change material,
   35-55% of phase-change energy storage agent,
   4-7% of phase-change temperature regulator,
   4-6% of nucleating agent,
   1-2% of thickening stabilizer,
   0.3-0.8% of preservative, and
   the balance being water.

3. The energy-storing temperature control material according to claim 1, wherein the phase-change energy storage agent comprises one or more of borax, sodium silicate decahydrate, ferrous sulfate heptahydrate, potassium aluminum sulfate dodecahydrate, magnesium chloride hexahydrate, zinc sulfate heptahydrate, copper sulfate pentahydrate, barium hydroxide octahydrate, calcium sulfate dihydrate and calcium disulfate monohydrate;

the phase-change temperature regulator is one or more of ammonium chloride, sodium chloride, potassium chloride and calcium chloride;

the thickening stabilizer is one or more of starch, dextrin, a polysaccharide derivative, carboxymethyl cellulose, polyvinylpyrrolidone, polyvinyl alcohol and a polyethylene oxide-polypropylene oxide block copolymer; and the preservative is one or more of calcium hypochlorite, sodium benzoate, potassium sorbate, calcium sorbate, paraben, chloramine, copper sulfate, methylene dithiocyanate, isothiazolinone and a phenol compound.

4. A preparation method of the energy-storing temperature control material according to claim 1, comprising the following steps:

(1) providing a thickening stabilizer aqueous solution; and (2) mixing the thickening stabilizer aqueous solution with an organic synthetic fiber based phase-change material, a phase-change energy storage agent, a phase-change temperature regulator, a preservative and a nucleating agent, and performing heating and stirring to obtain the energy-storing temperature control material.

5. The preparation method according to claim 4, wherein a mass concentration of the thickening stabilizer aqueous solution is 1-8%.

6. The preparation method according to claim 4, wherein a temperature for the heating and stirring is 20-60° C., a rate is 100-800 rpm and time is 2-12 h.

7. A metal foil wrapped energy-storing temperature control board, comprising:

gypsum boards;

energy-storing temperature control material packaged and adhered between two layers of the gypsum boards to form an energy-storing temperature control board, and the energy-storing temperature control board is wrapped with metal foil; wherein when used as a building insulation layer, the wrapped energy-storing temperature control board is embedded between a brick layer and a gypsum layer of a wall of a building;

wherein the energy-storing temperature control material comprising:

2-10% of organic synthetic fiber based phase-change material, 20-70% of phase-change energy storage agent, 3-10% of phase-change temperature regulator, 3-7% of nucleating agent, 1-5% of thickening stabilizer, 0.1-1% of preservative, and the balance being water, wherein the organic synthetic fiber based phase-change material comprises one or more of a bacterial cellulose fiber, a rayon fiber, a carboxymethyl cellulose fiber, a cellulose acetate fiber, a polypropylene fiber, a polyacrylate fiber, a polyacrylamide fiber and a polyol ester fiber; and the organic synthetic fiber based phase-change material has a diameter of 10-25 μm and a length of 5 mm, a particle size of the nucleating agent is from 10 nm to 800 nm; the organic synthetic fiber based phase-change material is composed of porous fibers to load the nucleating agent so that the nucleating agent is uniformly distributed in the organic synthetic fiber based phase-change material; and the nucleating agent is one or more of nano-calcium carbonate, nano-carbon particles, nano-magnesium silicate, nano-calcium oxide, nano-magnesium oxide, nano-cellulose and nano-lignin; and the energy-storing temperature control material has a phase-change point of 18-40° C., a thermal conductivity of $0.1$-$0.9$ $W \cdot m^{-1} \cdot K^{-1}$, and a specific heat capacity of 1000-3000 $J \cdot kg^{-1} \cdot K^{-1}$.

* * * * *